Patented Apr. 10, 1951

2,548,455

UNITED STATES PATENT OFFICE 2,548,455

CROSS LINKING

Joseph F. Walker, Westfield, and Stanley E. Kokowicz, Perth Amboy, N. J., assignors to E. I. du Pont de Nemours & Company, Wilmington, Del., a corporation of Delaware No Drawing. Application July 20, 1949, Serial No. 105,908

10 Claims. (Cl. 260—233.3)

This invention relates to an improved process for the cross-linking of molecules of cellulose or starch. It has long been known that molecules of high molecular weight substances containing recurring hydroxyl groups, for example, cellulose, regenerated cellulose, and starch may be cross-linked by compounds capable of reacting with two or more of the hydroxyl groups, and thereby build up complex molecules of the high molecular weight substances.

It is an object of this invention to provide an improved process of cross-linking the molecules of high molecular weight substances taken from the group consisting of cellulose, regenerated cellulose, and starch.

It is another object of this invention to provide an improved process of cross-linking the molecules of paper to increase the wet strength thereof.

It is another object of this invention to provide an improved process of cross-linking the molecules of starch to increase its water resistance.

Other objects of the invention will appear hereinafter.

The above objects may be accomplished in accordance with the present invention by contacting high molecular weight substances containing recurring hydroxyl groups, taken from the group consisting of cellulose, regenerated cellulose, and starch, with 2,5-dimethoxytetrahydrofuran in the presence of water at a pH of between 2.0 and 6.0 and at a temperature between 20° C. and 150° C.

2,5-dimethoxytetrahydrofuran is a colorless liquid having a boiling point of between 146° C. and 148° C. at 760 mm. Hg, and a solubility in water at 25° C. of about 29 grams per 100 grams solution. This compound may be prepared in accordance with the following example.

2,5-dimethoxy-2,5-dihydrofuran is hydrogenated to 2,5-dimethoxytetrahydrofuran by subjecting the same, at a pressure of about 75 to 100 atmospheres, to the action of hydrogen in the presence of Raney nickel, or nickel on kieselguhr, as a catalyst. Yields of 90% to 95% of 2,5-dimethoxytetrahydrofuran are thus obtained.

2,5-dimethoxy-2,5-dihydrofuran may, for example, be produced by passing 1.0 mole chlorine through a solution of 1.0 mole furan and 2.8 moles sodium carbonate in 16.0 moles methanol at a temperature of −10° C. to 5° C.

2,5-dimethoxytetrahydrofuran dissolves very slowly in water at room temperature to form a clear 29% saturated solution which hydrolyzes slowly to succinaldehyde on aging. Its behavior as succinaldehyde has been confirmed by reaction with hydroxylamine hydrochloride to give a quantitative yield of the known succindialdoxime. The apparent concentration of succinaldehyde in such a solution reaches a maximum of 14% (74.1% hydrolyzed 2,5 - dimethoxytetrahydrofuran) at the end of two weeks. Rates of solution and hydrolysis may be accelerated by heating the solution. Addition of traces of hydrochloric acid also increases the rate and extent of hydrolysis. The addition of zinc chloride or hydrogen peroxide to 2,5-dimethoxytetrahydrofuran solutions does not accelerate the rate of hydrolysis at room temperature. The degree of hydrolysis of 2,5-dimethoxytetrahydrofuran solutions varies inversely with 2,5-dimethoxytetrahydrofuran concentration.

The procedure which has been found most satisfactory for determining the rate and extent of hydrolysis involves the sodium sulfite technique for aldehyde analysis.

The two terminal carbonyl groups of the succinaldehyde react with hydroxyl radicals of two molecules of the above-said high molecular weight substance to cross-link the two molecules in a known manner. The 2,5-dimethoxytetrahydrofuran functions therefore as a latent succinaldehyde. The hydrolysis of the 2,5-dimethoxytetrahydrofuran may be made to take place slowly or with rapidity by varying the amount of water present, by varying the degree of acidity, or by varying the temperature of the solution.

The use of 2,5-dimethoxytetrahydrofuran in the cross-linking of the molecules of cellulose, regenerated cellulose and starch is particularly advantageous in comparison to the similar use of succinaldehyde by reason of the control which may be exercised over the degree of hydrolysis whereby, in turn, the rate of cross-linking of said molecules can be controlled.

The high molecular weight substances contemplated for cross-linking in accordance with this invention include starch and cellulose materials such as paper, wood, cotton, and regenerated cellulose. The molecules of such substances contain recurring hydroxyl groups which readily react with carbonyl groups of succinaldehyde to cross-link a plurality of the molecules to each other.

The treatment of the high molecular weight substances with the 2,5-dimethoxytetrahydrofuran must take place in the presence of some water to dissolve and hydrolyze the 2,5-dimethoxytetrahydrofuran to succinaldehyde. The amount of water present may be varied between wide limits, depending upon the degree of hydrolysis and the concentration of succinaldehyde desired.

The hydrolysis of the 2-5-dimethoxytetrahydrofuran to succinaldehyde and the cross-linking action of the succinaldehyde on the molecules of the high molecular weight substance treated takes place to best advantage if the aqueous solution of 2,5-dimethoxytetrahydrofuran has a pH of between 2.0 and 6.0, and preferably between 3.0 and 5.0. If the high molecular weight material which is being cross-linked is acidic in nature, e. g., corn starch, additional acid need not be added. In other cases it may be necessary to add slight amounts of acid to impart to the solution the desired pH value. The desired acidity may be obtained by the addition of any acidic material which will impart to the solution the desired pH value. Mineral acids, for example, hydrochloric, sulfuric, or phosphoric acids, or organic acids, for example, formic, oxalic, acetic, or propionic acids, may be used for this purpose. Acidic salts such as zinc chloride, aluminum chloride, sodium acid sulfate or the like may also, in general, be used. In some instances, it is preferred not to use strong acids since they may have a tendency to embrittle or discolor the resulting cross-linked product.

Although the hydrolysis of the 2,5-dimethoxytetrahydrofuran and the cross-linking reaction will take place at room temperature, the rate and degree of cross-linking obtainable will increase at increased temperatures. Generally, the temperatures employed are not carried beyond about 150° C., as the rate of the reactions and the degree of cross-linking cannot be adequately controlled above this temperature.

The following examples are given to illustrate, in detail, preferred procedures in particular applications of the invention to both cellulosic materials and starch. It is to be understood, of course, that the specific details of these examples are not to be taken as limitative of the invention.

EXAMPLE I

*Improving wet tensile strength of paper*

Experimental studies show that wet strength values equal to about 70% of the dry strength are obtainable by treating absorbent paper with hydrolyzed 2,5-dimethoxytetrahydrofuran solutions in the presence of acidic catalysts. This treatment, surprisingly, has no appreciable effect on the water absorptivity of the paper. The reactivity of the treating solution depends on the extent of hydrolysis of the 2,5-dimethoxytetrahydrofuran to succinaldehyde. Solutions previously hydrolyzed to contain a maximum concentration of succinaldehyde are most beneficial, whereas partially hydrolyzed solutions are less satisfactory and non-hydrolyzed solutions are not effective. The relationship between degree of hydrolysis and wet tensile strength is illustrated below. The 2,5-dimethoxytetrahydrofuran solutions used in these tests have been diluted to 4% by weight from 29% solutions which have been previously hydrolyzed, as indicated in the table.

| 2,5-Dimethoxytetrahydrofuran, Per Cent Hydrolyzed | Type of Hydrolysis | Wet Tensile Strength, Per Cent of Dry Strength |
|---|---|---|
| 22.4 | 1 day at room temp | 25 |
| 39.6 | 2 days at room temp | 31 |
| 62.0 | 5 days at room temp | 59 |
| 69.4 | 7 days at room temp | 71 |
| 84.0 | Reflux 0.5 hour | 73 |

Although hydrolyzed 2,5-dimethoxytetrahydrofuran solutions are acidic (pH about 4.0), it has been necessary to use an acid catalyst to impart wet strength to paper. Zinc chloride has been found to be most satisfactory because its embrittling action on the paper has been the least of all the catalysts evaluated. Its catalytic effect is unique in that the pH of the treating solution is raised rather than lowered. The optimum concentration limits of zinc chloride appear to be 2.5% to 10% by weight of 2,5-dimethoxytetrahydrofuran as shown below.

| $ZnCl_2$ Per Cent Conc. on 2,5-Dimethoxytetrahydrofuran | pH | Wet Tensile Strength, Per Cent of Dry Strength |
|---|---|---|
| ---- | 4.20 | 25 |
| 1.0 | 4.15 | 29 |
| 2.5 | 4.70 | 67 |
| 5.0 | 4.70 | 71 |
| 7.5 | 5.40 | 69 |
| 10.0 | 5.50 | 63 |

In these tests, zinc chloride was added to a 4% 2,5-dimethoxytetrahydrofuran solution prepared by diluting a 29% solution which had been previously hydrolyzed by aging one week at room temperature. Zinc chloride was added to a freshly prepared 2,5-dimethoxytetrahydrofuran solution in an attempt to accelerate hydrolysis at room temperature so that maximum wet strength might be obtained in minimum time, but did not result in any measurable improvement.

Other catalysts evaluated for this application exhibit varying degrees of effectiveness. Hydrochloric and oxalic acids, ammonium chloride, ammonium oxalate, aluminum chloride, ferric ammonium sulfate, glycollic acid and a disodium phosphate-citric acid buffer give wet strength values varying from 41% to 69% of the dry strength of the untreated samples. Moreover, where discoloration or embrittlement of the paper is objectionable, zinc chloride is a more satisfactory catalyst than the other catalyst materials mentioned above.

An important factor governing the effectiveness of succinaldehyde in improving the wet strength of paper is the amount used. Maximum wet strength is obtained by employing an equivalent of 2.6% succinaldehyde (4.0% 2,5-dimethoxytetrahydrofuran) by weight of paper. The use of larger quantities offers no advantages, since the resulting wet strength values are equal to those obtained at the 2.6% concentration. On the other hand, when the amount is reduced to 1.3%, the wet strength is reduced appreciably, as illustrated below:

| Per Cent Concentration in Solution | | Wet Tensile Strength, Per Cent of Dry Strength |
|---|---|---|
| Succinaldehyde | 2,5-Dimethoxytetrahydrofuran | |
| 1.30 | 2.0 | 55 |
| 2.60 | 4.0 | 71 |
| 3.77 | 5.8 | 71 |
| 5.20 | 8.0 | 70 |

The average amount of dilute 2,5-dimethoxytetrahydrofuran solution absorbed by filter paper on soaking is 100% by weight of paper. Assuming that the solution components are absorbed proportionately, the amount of succinaldehyde take-up is equivalent to the per cent concentration of succinaldehyde in solution.

The effective temperature range for obtaining satisfactory wet strength has been found to be about 100° C. to 150° C. Processing the paper at 115° C. to 125° C. for thirty minutes is preferred, since greatest improvement is obtained under these conditions, as shown below:

| Temperature, ° C. | Time, Minutes | Wet Tensile Strength, Per Cent of Dry Strength |
| --- | --- | --- |
| 65 | 30 | 35 |
| 105 | ¹3 | 36 |
| 105 | 15 | 52 |
| 105 | 30 | 60 |
| 115-125 | 15 | 62 |
| 115-125 | 30 | 71 |

¹ The treated paper strips in this case were baked on a hot plate, all others being processed in an oven.

The wet strength of the paper does not improve on aging after a preliminary bake at 105° C.

2,5-dimethoxytetrahydrofuran solutions yield methanol in addition to succinaldehyde as a product of hydrolysis. The presence of methanol in hydrolyzed 2,5-dimethoxytetrahydrofuran solutions slightly inhibits the reactivity of succinaldehyde with paper. The use of hydrolyzed 2,5-dimethoxytetrahydrofuran solutions from which methanol has been removed by distillation results in the greatest improvement of wet strength. Values equal to 83% of the dry strength have been obtained. Solutions from which methanol has been removed are not always desired since the paper is slightly discolored by treatment therewith.

Although 2,5-dimethoxytetrahydrofuran solutions can be rapidly hydrolyzed to maximum succinaldehyde content by boiling or by treating with traces of hydrochloric acid at room temperature, rapid hydrolysis is not recommended due to discoloration of the paper during treatment. Slowly hydrolyzed solutions, those which are allowed to age at room temperature, do not discolor the paper during treatment and are, therefore, preferred. However, any unreacted succinaldehyde which remains in the treated paper will polymerize and darken on aging and will eventually discolor the paper. This may be prevented by washing the treated paper with a 10% sodium bisulfite solution. The role of sodium bisulfite in the prevention of discoloration involves the formation of a stable white bisulfite addition compound typical of aldehydes. Washing the treated paper with water rather than with sodium bisulfite is not satisfactory, since the last traces of unreacted succinaldehyde are difficult to wash out. Since this addition compound is very soluble in water, its removal from the paper by washing with water is readily accomplished. Paper treated with hydrolyzed 2,5-dimethoxytetrahydrofuran and zinc chloride catalyst exhibits greater wet strengths than paper treated similarly with glyoxal or 2-hydroxyadipaldehyde.

The following method is recommended for the treatment of paper to obtain maximum wet tensile strengths:

Prepare a 4% solution of 2,5-dimethoxytetrahydrofuran in water and hydrolyze by aging for one week at room temperature. Add zinc chloride equivalent to 5% of the weight of 2,5-dimethoxytetrahydrofuran used. Immerse the paper in this solution for thirty seconds. Remove and bake in a forced draft oven for thirty minutes at 115° C. to 125° C. Immerse the treated paper in a 10% aqueous sodium bisulfite solution for one minute and bake in an oven until dry. After treatment with sodium bisulfite solution, the paper may be washed with water to remove the reaction product of sodium bisulfite and succinaldehyde, if desired.

EXAMPLE II

*Insolubilization of starch*

The water resistance of unconverted corn starch at 40° C. is increased about thirteen fold by treating the starch paste with 2,5-dimethoxytetrahydrofuran equivalent to about 3% of the weight of dry starch. No catalyst is needed. However, the pH of corn starch paste is about 4.5, and therefore within the range which proved most effective for improving the wet strength of paper. For this use, non-hydrolyzed 2,5-dimethoxytetrahydrofuran is just as effective as previously hydrolyzed solutions. Glyoxal and 2-hydroxyadipaldehyde are not satisfactory for insolubilizing corn starch. Converted starches, which have a higher pH, require the addition of small quantities of acidic catalysts for best results, for example, sufficient acidic catalysts to give a pH of about 2.0 to 4.0.

The following procedure is recommended for preparing the modified starch:

Prepare starch paste by gradually heating a slurry of unconverted corn starch in nine parts by weight of water to 90° C. to 95° C. over a period of two hours and holding at this temperature for thirty minutes. Add about 3% by weight of the dry starch content of 2,5-dimethoxytetrahydrofuran to the paste while it is still hot, agitate for five minutes and allow to cool. Adhesive seals prepared from the above-prepared starch paste, after curing for fifteen minutes at 65° C., were intact after 268 hours' immersion in water at 30° C. The controls prepared from untreated starch paste failed after about 20 hours. No catalyst was used, but the paste itself had a pH of 4.5 before addition of 2,5-dimethoxytetrahydrofuran.

Paste samples were tested by pasting strips of manila paper with this adhesive, making a one inch by one inch lap seal. After baking in the oven at 65° C. for fifteen minutes, test strips were placed in a water bath maintained at 30° C. The strips were then tested periodically for adhesion by fastening a weight on one end of the strip and raising three times. This testing was continued until the seal failed. Controls were run with each batch of starch paste. Appreciable improvement in water resistance is noted even without the baking treatment. Paste is still satisfactory after five days' storage.

Two examples of commercially available converted starches were similarly modified with 2,5-dimethoxytetrahydrofuran. Sufficient acidifying material, for example, HCl, was added to adjust the pH to between 2.0 and 4.0. Twenty-five per cent (25%) dispersions of these starches were heated at 95° C. and then 4% 2,5-dimethoxytetrahydrofuran added. In this case the seals prepared with modified pastes were intact after 500 hours' immersion in water at 30° C., whereas the controls failed in 0.5 to 1.5 hours. Because of the acid conditions, it makes no difference whether hydrolyzed or unhydrolyzed 2,5-dimethoxytetrahydrofuran is added to the paste.

Succinaldehyde appears to be unique in causing this effect, because the use of glyoxal or hydroxyadipaldehyde in a like manner did not improve the starch paste.

The water resistance obtained increases with the quantity of 2,5-dimethoxytetrahydrofuran added up to 4% of the weight of anhydrous starch. Pastes containing 4% to 100% 2,5-dimethoxytetrahydrofuran based on starch were all completely resistant during the extended laboratory tests, so that no comparative values were obtained for these higher concentrations. The following table shows the effects of varying 2,5-dimethoxytetrahydrofuran concentrations on the water resistance of 25% converted starch pastes.

| 2,5-Dimethoxy-tetrahydrofuran Conc. Per Cent (Based on Dry Starch) | Time Before Seals Failed In Water at 35° C. |
|---|---|
|  | Hours |
| ------------ | 0.5 |
| 0.25 | 0.5 |
| 0.50 | 1.5 |
| 1.00 | 1.5 |
| 2.00 | 65.0 |
| 4.00 | 240.0 |

As indicated, these tests were carried out in water maintained at 35° C. When the tests were carried out at 30° C., the starch seals prepared with 4% 2,5-dimethoxytetrahydrofuran survived 500 hours' immersion, whereas the controls failed in 0.5 to 1.0 hour.

As mentioned above, it was found desirable to use an acid catalyst with the converted starches to reduce the pH of the pastes to about 2.0 to 4.0. Hydrochloric and oxalic acids were both found to be effective, but more of the latter was required to reach the same pH value.

EXAMPLE III

*Shrinksetting and creaseproofing regenerated cellulose textiles*

Very effective shrinksetting properties of 2,5-dimethoxytetrahydrofuran are demonstrated by treating regenerated cellulose rayon fabric with a 10% aqueous solution of 2,5-dimethoxytetrahydrofuran in the presence of 5% by weight of the solution of oxalic acid at pH 3.0 to 4.0 and baking. Zinc chloride is also an effective catalyst and may be more desirable in cases where a slight discoloration is objectionable.

The crease resistance of regenerated cellulose rayon treated with a 29% aqueous 2,5-dimethoxytetrahydrofuran solution in the presence of 5% by weight of the solution of zinc chloride catalyst and baked at 140° C. for fifteen minutes was determined by measuring the recovery angle of a folded sample of the treated fabric. The reduction in the crease angle amounted to 70% for the rayon when compared to control samples tested at the same time. In a similar test with cotton fabric, using 4% aqueous 2,5-dimethoxytetrahydrofuran and 10% $NH_4Cl$ by weight of the 2,5-dimethoxytetrahydrofuran, a 44% reduction in the crease angle, in comparison with a control, was obtained.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

We claim:

1. The process of cross-linking the molecules of a substance taken from the group consisting of cellulose, regenerated cellulose and starch which comprises contacting the said substance with upwards of about 2% by weight of said substance of 2,5-dimethoxytetrahydrofuran in the presence of sufficient water to hydrolyze the 2,5-dimethoxytetrahydrofuran at a pH of between 2.0 and 6.0 and at a temperature of between 20° C. and 150° C.

2. The process of cross-linking the molecules of a substance taken from the group consisting of cellulose, regenerated cellulose and starch which comprises contacting the said substance with upwards of about 2% by weight of said substance of 2,5-dimethoxytetrahydrofuran in the presence of sufficient water to hydrolyze the 2,5-dimethoxytetrahydrofuran and sufficient zinc chloride to impart a pH of between 2.0 and 6.0 to the mixture at a temperature of between 20° C. and 150° C.

3. The process of cross-linking the molecules of paper which comprises contacting paper with an aqueous solution of 2,5-dimethoxytetrahydrofuran containing upwards of about 2% by weight of said paper of 2,5-dimethoxytetrahydrofuran having a pH of between 2.0 and 6.0 and a temperature of between 20° C. and 150° C.

4. The process of cross-linking the molecules of paper which comprises contacting paper with an aqueous solution of 2,5-dimethoxytetrahydrofuran containing upwards of about 2% by weight of said paper of 2,5-dimethoxytetrahydrofuran and sufficient zinc chloride to impart to said solution a pH of between 4.0 and 5.0, and baking said paper at a temperature of between 100° C. and 150° C.

5. The process of cross-linking the molecules of paper which comprises contacting paper with an aqueous solution of 2,5-dimethoxytetrahydrofuran containing upwards of about 2% by weight of said paper of 2,5-dimethoxytetrahydrofuran and sufficient zinc chloride to impart to said solution a pH of between 4.0 and 5.0, baking said paper at a temperature of between 100° C. and 150° C. immersing said paper in a solution of sodium bisulfite, and drying the same.

6. The process of cross-linking the molecules of paper which comprises contacting paper with an aqueous solution of 2,5-dimethoxytetrahydrofuran containing upwards of about 2% by weight of said paper of 2,5-dimethoxytetrahydrofuran and sufficient zinc chloride to impart to said solution a pH of between 4.0 and 5.0, baking said paper at a temperature of between 100° C. and 150° C., immersing said paper in a solution of sodium bisulfite, washing the paper with water, and drying the same.

7. The process of cross-linking the molecules of starch which comprises contacting an aqueous starch paste having a pH between 2.0 and 6.0 with an aqueous solution of 2,5-dimethoxytetrahydrofuran containing upwards of about 2% by weight of said starch of 2,5-dimethoxytetrahydrofuran at a temperature of between 20° C. and 150° C.

8. The process of cross-linking the molecules of starch which comprises contacting an aqueous starch paste containing sufficient zinc chloride to impart to the paste a pH of between 2.0 and 6.0 with an aqueous solution of 2,5-dimethoxytetrahydrofuran containing upwards of about 2% by weight of said starch of 2,5-dimethoxytetrahydrofuran at a temperature of between 20° C. and 150° C.

9. The process of cross-linking the molecules of starch which comprises contacting an aqueous starch paste having a pH between 2.0 and 6.0 with an aqueous solution of 2,5-dimethoxytetrahydrofuran containing upwards of about 2% by weight of said starch of 2,5-dimethoxytetrahydrofuran and having a concentration of at least 4% at a temperature of between 20° C. and 150° C.

10. The process of cross-linking the molecules of starch which comprises contacting an aqueous starch paste containing sufficient zinc chloride to impart to the paste a pH of between 2.0 and 6.0 with an aqueous solution of 2,5-dimethoxytetrahydrofuran containing upwards of about 2% by weight of said starch of 2,5-dimethoxytetrahydrofuran and having a concentration of at least 4% at a temperature of between 20° C. and 150° C.

JOSEPH F. WALKER.
STANLEY E. KOKOWICZ.

REFERENCES CITED

The following references are of record in the file of this patent:

UNITED STATES PATENTS

| Number | Name | Date |
|---|---|---|
| 2,107,343 | Rockwood et al. | Feb. 8, 1938 |
| 2,441,859 | Weisberg et al. | May 18, 1948 |
| 2,495,232 | Drisch et al. | Jan. 24, 1950 |
| 2,495,239 | Drisch et al. | Jan. 24, 1950 |